(12) United States Patent
Potter et al.

(10) Patent No.: US 7,516,176 B2
(45) Date of Patent: Apr. 7, 2009

(54) DISTRIBUTED REQUEST AND RESPONSE QUEUES FOR SERVICE PROCESSOR

(75) Inventors: Timothy A. Potter, Denver, CO (US); Mitch Upton, Highlands Ranch, CO (US); Christa Golding, Littleton, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

(21) Appl. No.: 11/684,435

(22) Filed: Mar. 9, 2007

(65) Prior Publication Data

US 2007/0150598 A1    Jun. 28, 2007

Related U.S. Application Data

(63) Continuation of application No. 10/293,059, filed on Nov. 13, 2002, now Pat. No. 7,222,148.

(60) Provisional application No. 60/377,332, filed on May 2, 2002.

(51) Int. Cl.
*G06F 15/16* (2006.01)

(52) U.S. Cl. .................. 709/201; 709/203; 709/217; 707/201; 707/202; 707/204

(58) Field of Classification Search ......... 709/201–203, 709/206–207, 217–219, 225–226; 370/392, 370/401; 707/201–204
See application file for complete search history.

(56) References Cited

U.S. PATENT DOCUMENTS

| | | | |
|---|---|---|---|
| 5,283,897 A | | 2/1994 | Georgiadis et al. |
| 5,321,841 A | | 6/1994 | East et al. |
| 5,469,562 A | | 11/1995 | Saether |
| 5,544,318 A | * | 8/1996 | Schmitz et al. ............. 709/207 |
| 5,604,860 A | | 2/1997 | McLaughlin et al. |
| 5,630,131 A | | 5/1997 | Palevich et al. |
| 5,748,975 A | | 5/1998 | Van De Vanter |
| 5,801,958 A | | 9/1998 | Dangelo et al. |

(Continued)

FOREIGN PATENT DOCUMENTS

CA    2248634    3/2000

(Continued)

OTHER PUBLICATIONS

U.S. Appl. No. 10/271,194, filed Oct. 15, 2002, Upton.

(Continued)

*Primary Examiner*—Bharat N Barot
(74) *Attorney, Agent, or Firm*—Fliesler Meyer LLP

(57) ABSTRACT

Highly-available processing of an asynchronous request can be accomplished in a single transaction. A distributed request queue receives a service request from a client application or application view client. A service processor is deployed on each node of a cluster containing the distributed request queue. A service processor pulls the service request from the request queue and invokes the service for the request, such as to an enterprise information system. If that service processor fails, another service processor in the cluster can service the request. The service processor receives a service response from the invoked service and forwards the service response to a distributed response queue. The distributed response queue holds the service response until the response is retrieved for the client application.

24 Claims, 2 Drawing Sheets

U.S. PATENT DOCUMENTS

| | | | |
|---|---|---|---|
| 5,828,847 A | 10/1998 | Gehr et al. | |
| 5,835,769 A | 11/1998 | Jervis et al. | |
| 5,836,014 A | 11/1998 | Faiman, Jr. | |
| 5,862,327 A | 1/1999 | Kwang et al. | |
| 5,892,913 A | 4/1999 | Adiga et al. | |
| 5,915,013 A * | 6/1999 | Mintz et al. | 379/230 |
| 5,933,838 A | 8/1999 | Lomet | |
| 5,944,794 A | 8/1999 | Okamoto et al. | |
| 5,950,010 A | 9/1999 | Hesse et al. | |
| 5,951,694 A | 9/1999 | Choquier et al. | |
| 5,961,593 A | 10/1999 | Gabber et al. | |
| 5,966,535 A | 10/1999 | Benedikt et al. | |
| 6,012,083 A | 1/2000 | Savitzky et al. | |
| 6,012,094 A | 1/2000 | Leymann et al. | |
| 6,016,495 A | 1/2000 | McKeehan et al. | |
| 6,018,730 A | 1/2000 | Nichols et al. | |
| 6,021,443 A | 2/2000 | Bracho et al. | |
| 6,023,578 A | 2/2000 | Birsan et al. | |
| 6,023,722 A * | 2/2000 | Colyer | 709/201 |
| 6,028,997 A | 2/2000 | Leymann et al. | |
| 6,029,000 A | 2/2000 | Woolsey et al. | |
| 6,044,217 A | 3/2000 | Brealey et al. | |
| 6,061,721 A | 5/2000 | Ismael et al. | |
| 6,067,623 A | 5/2000 | Blakley, III et al. | |
| 6,070,184 A | 5/2000 | Blount et al. | |
| 6,078,943 A | 6/2000 | Yu | |
| 6,081,840 A | 6/2000 | Zhao | |
| 6,085,030 A | 7/2000 | Whitehead et al. | |
| 6,119,143 A | 9/2000 | Dias et al. | |
| 6,119,149 A | 9/2000 | Notani | |
| 6,128,279 A | 10/2000 | O'Neil et al. | |
| 6,131,118 A | 10/2000 | Stupek, Jr. et al. | |
| 6,141,686 A | 10/2000 | Jackowski et al. | |
| 6,141,701 A | 10/2000 | Whitney | |
| 6,154,738 A | 11/2000 | Call | |
| 6,154,769 A | 11/2000 | Cherkasova et al. | |
| 6,185,734 B1 | 2/2001 | Saboff et al. | |
| 6,189,044 B1 | 2/2001 | Thomson et al. | |
| 6,195,680 B1 | 2/2001 | Goldszmidt et al. | |
| 6,212,546 B1 | 4/2001 | Starkovich et al. | |
| 6,222,533 B1 | 4/2001 | Notani et al. | |
| 6,226,666 B1 * | 5/2001 | Chang et al. | 709/201 |
| 6,226,675 B1 | 5/2001 | Meltzer et al. | |
| 6,226,788 B1 | 5/2001 | Schoening et al. | |
| 6,230,160 B1 | 5/2001 | Chan et al. | |
| 6,230,287 B1 | 5/2001 | Pinard et al. | |
| 6,230,309 B1 | 5/2001 | Turner et al. | |
| 6,233,607 B1 | 5/2001 | Taylor et al. | |
| 6,237,135 B1 | 5/2001 | Timbol | |
| 6,243,737 B1 | 6/2001 | Flanagan et al. | |
| 6,253,230 B1 | 6/2001 | Couland et al. | |
| 6,269,373 B1 | 7/2001 | Apte et al. | |
| 6,282,711 B1 | 8/2001 | Halpern et al. | |
| 6,292,830 B1 | 9/2001 | Taylor et al. | |
| 6,292,932 B1 | 9/2001 | Baisley et al. | |
| 6,311,327 B1 | 10/2001 | O'Brien et al. | |
| 6,317,786 B1 | 11/2001 | Yamane et al. | |
| 6,324,681 B1 | 11/2001 | Sebesta et al. | |
| 6,330,569 B1 | 12/2001 | Baisley et al. | |
| 6,334,114 B1 | 12/2001 | Jacobs et al. | |
| 6,336,122 B1 | 1/2002 | Lee et al. | |
| 6,338,064 B1 | 1/2002 | Ault et al. | |
| 6,343,265 B1 | 1/2002 | Glebov et al. | |
| 6,345,283 B1 | 2/2002 | Anderson | |
| 6,348,970 B1 | 2/2002 | Marx | |
| 6,349,408 B1 | 2/2002 | Smith | |
| 6,353,923 B1 | 3/2002 | Bogel et al. | |
| 6,356,906 B1 | 3/2002 | Lippert et al. | |
| 6,360,221 B1 | 3/2002 | Gough et al. | |
| 6,360,358 B1 | 3/2002 | Elsbree et al. | |
| 6,367,068 B1 | 4/2002 | Vaidyanathan et al. | |
| 6,374,297 B1 | 4/2002 | Wolf et al. | |
| 6,377,939 B1 | 4/2002 | Young | |
| 6,393,605 B1 | 5/2002 | Loomans | |
| 6,408,311 B1 | 6/2002 | Baisley et al. | |
| 6,411,698 B1 | 6/2002 | Bauer et al. | |
| 6,438,594 B1 | 8/2002 | Bowman-Amuah | |
| 6,442,565 B1 | 8/2002 | Tyra et al. | |
| 6,442,611 B1 | 8/2002 | Navarre et al. | |
| 6,445,711 B1 | 9/2002 | Scheel et al. | |
| 6,463,503 B1 | 10/2002 | Jones et al. | |
| 6,470,364 B1 | 10/2002 | Prinzing | |
| 6,515,967 B1 | 2/2003 | Wei et al. | |
| 6,516,322 B1 | 2/2003 | Meredith | |
| 6,535,908 B1 * | 3/2003 | Johnson et al. | 709/217 |
| 6,549,949 B1 | 4/2003 | Bowman-Amuah | |
| 6,553,425 B1 * | 4/2003 | Shah et al. | 709/245 |
| 6,560,769 B1 | 5/2003 | Moore et al. | |
| 6,584,454 B1 | 6/2003 | Hummel et al. | |
| 6,594,693 B1 | 7/2003 | Borwankar | |
| 6,594,700 B1 | 7/2003 | Graham et al. | |
| 6,601,113 B1 | 7/2003 | Koistinen et al. | |
| 6,604,198 B1 | 8/2003 | Beckman et al. | |
| 6,609,115 B1 | 8/2003 | Mehring et al. | |
| 6,615,258 B1 | 9/2003 | Barry et al. | |
| 6,622,168 B1 * | 9/2003 | Datta | 709/219 |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,681,251 B1 * | 1/2004 | Leymann et al. | 709/226 |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,697,849 B1 | 2/2004 | Carlson | |
| 6,711,407 B1 * | 3/2004 | Cornils | 455/428 |
| 6,721,740 B1 | 4/2004 | Skinner et al. | |
| 6,721,747 B2 | 4/2004 | Lipkin | |
| 6,721,779 B1 | 4/2004 | Maffeis | |
| 6,732,237 B1 | 5/2004 | Jacobs et al. | |
| 6,748,420 B1 | 6/2004 | Quatrano et al. | |
| 6,754,884 B1 | 6/2004 | Lucas et al. | |
| 6,782,416 B2 | 8/2004 | Cochran et al. | |
| 6,789,054 B1 | 9/2004 | Makhlouf | |
| 6,795,967 B1 | 9/2004 | Evans et al. | |
| 6,802,000 B1 | 10/2004 | Greene et al. | |
| 6,804,686 B1 | 10/2004 | Stone et al. | |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,857,012 B2 | 2/2005 | Sim et al. | |
| 6,859,180 B1 | 2/2005 | Rivera | |
| 6,859,834 B1 | 2/2005 | Arora et al. | |
| 6,874,143 B1 | 3/2005 | Murray et al. | |
| 6,886,041 B2 * | 4/2005 | Messinger et al. | 709/203 |
| 6,889,244 B1 | 5/2005 | Gaither et al. | |
| 6,910,041 B2 | 6/2005 | Exton et al. | |
| 6,915,519 B2 | 7/2005 | Williamson et al. | |
| 6,918,084 B1 | 7/2005 | Slaughter et al. | |
| 6,922,827 B2 | 7/2005 | Vasilik et al. | |
| 6,925,482 B2 | 8/2005 | Gopal | |
| 6,925,492 B2 | 8/2005 | Shirriff | |
| 6,950,825 B2 | 9/2005 | Chang | |
| 6,950,872 B2 | 9/2005 | Todd, II | |
| 6,963,914 B1 | 11/2005 | Breitbart et al. | |
| 6,970,939 B2 | 11/2005 | Sim | |
| 6,971,096 B1 | 11/2005 | Ankireddipally et al. | |
| 6,976,086 B2 | 12/2005 | Sadeghi et al. | |
| 6,983,328 B2 | 1/2006 | Beged-Dov et al. | |
| 7,000,219 B2 | 2/2006 | Barrett et al. | |

| | | |
|---|---|---|
| 7,017,146 B2 | 3/2006 | Dellarocas et al. |
| 7,043,722 B2 | 5/2006 | Bau, III |
| 7,047,287 B2 | 5/2006 | Sim et al. |
| 7,051,072 B2 | 5/2006 | Stewart et al. |
| 7,051,316 B2 | 5/2006 | Charisius et al. |
| 7,054,858 B2 | 5/2006 | Sutherland |
| 7,058,014 B2 | 6/2006 | Sim |
| 7,058,637 B2 | 6/2006 | Britton et al. |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,073,167 B2 | 7/2006 | Iwashita |
| 7,076,772 B2 | 7/2006 | Zatloukal |
| 7,089,584 B1 | 8/2006 | Sharma |
| 7,096,422 B2 | 8/2006 | Rothschiller et al. |
| 7,103,046 B2 * | 9/2006 | Tuck et al. ............... 370/401 |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,143,186 B2 | 11/2006 | Stewart et al. |
| 7,146,422 B1 | 12/2006 | Marlatt et al. |
| 7,155,705 B1 | 12/2006 | Hershberg et al. |
| 7,165,041 B1 | 1/2007 | Guheen et al. |
| 7,181,731 B2 | 2/2007 | Pace et al. |
| 7,184,967 B1 | 2/2007 | Mital et al. |
| 7,240,331 B2 | 7/2007 | Vion-Dury et al. |
| 7,260,599 B2 | 8/2007 | Bauch et al. |
| 7,260,818 B1 | 8/2007 | Iterum et al. |
| 7,269,630 B2 * | 9/2007 | Abbondanzio et al. ...... 709/211 |
| 7,333,974 B2 * | 2/2008 | Patterson .................... 707/202 |
| 7,472,349 B1 * | 12/2008 | Srivastava et al. ........... 709/227 |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Marcready et al. |
| 2002/0026630 A1 | 2/2002 | Schmidt et al. |
| 2002/0035604 A1 | 3/2002 | Cohen et al. |
| 2002/0073396 A1 | 6/2002 | Crupi et al. |
| 2002/0078365 A1 | 6/2002 | Burnette et al. |
| 2002/0083075 A1 | 6/2002 | Brummel et al. |
| 2002/0083118 A1 | 6/2002 | Sim |
| 2002/0083187 A1 | 6/2002 | Sim et al. |
| 2002/0111820 A1 | 8/2002 | Massey |
| 2002/0111922 A1 | 8/2002 | Young et al. |
| 2002/0116454 A1 | 8/2002 | Dyla et al. |
| 2002/0120685 A1 | 8/2002 | Srivastava et al. |
| 2002/0120786 A1 | 8/2002 | Sehayek et al. |
| 2002/0133491 A1 | 9/2002 | Sim et al. |
| 2002/0143960 A1 | 10/2002 | Goren et al. |
| 2002/0152106 A1 | 10/2002 | Stoxen et al. |
| 2002/0161826 A1 | 10/2002 | Arteaga et al. |
| 2002/0165936 A1 | 11/2002 | Alston et al. |
| 2002/0169644 A1 | 11/2002 | Greene |
| 2002/0174178 A1 | 11/2002 | Stawikowski |
| 2002/0174241 A1 | 11/2002 | Beged-Dov et al. |
| 2002/0184145 A1 | 12/2002 | Sijacic et al. |
| 2002/0184610 A1 | 12/2002 | Chong et al. |
| 2002/0188486 A1 | 12/2002 | Gil et al. |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2002/0198800 A1 | 12/2002 | Shamrakov |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0018661 A1 | 1/2003 | Darugar |
| 2003/0018665 A1 | 1/2003 | Dovin et al. |
| 2003/0018832 A1 | 1/2003 | Amirisetty et al. |
| 2003/0018963 A1 | 1/2003 | Ashworth et al. |
| 2003/0023957 A1 | 1/2003 | Bau et al. |
| 2003/0028364 A1 | 2/2003 | Chan et al. |
| 2003/0028579 A1 | 2/2003 | Kulkarni et al. |
| 2003/0031176 A1 | 2/2003 | Sim |
| 2003/0033437 A1 | 2/2003 | Fischer et al. |
| 2003/0043191 A1 | 3/2003 | Tinsley et al. |
| 2003/0046266 A1 | 3/2003 | Mullins et al. |
| 2003/0046591 A1 | 3/2003 | Asghari-Kamrani et al. |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0061405 A1 | 3/2003 | Fisher et al. |
| 2003/0074217 A1 | 4/2003 | Beisiegel et al. |
| 2003/0074467 A1 | 4/2003 | Oblak et al. |
| 2003/0079029 A1 | 4/2003 | Garimella et al. |
| 2003/0084203 A1 | 5/2003 | Yoshida et al. |
| 2003/0093402 A1 | 5/2003 | Upton |
| 2003/0093403 A1 | 5/2003 | Upton |
| 2003/0093470 A1 | 5/2003 | Upton |
| 2003/0093471 A1 | 5/2003 | Upton |
| 2003/0097345 A1 | 5/2003 | Upton |
| 2003/0097574 A1 | 5/2003 | Upton |
| 2003/0105884 A1 | 6/2003 | Upton |
| 2003/0110117 A1 | 6/2003 | Saidenberg et al. |
| 2003/0110315 A1 | 6/2003 | Upton |
| 2003/0110446 A1 | 6/2003 | Nemer |
| 2003/0126136 A1 | 7/2003 | Omoigui |
| 2003/0145047 A1 | 7/2003 | Upton |
| 2003/0149791 A1 | 8/2003 | Kane et al. |
| 2003/0167358 A1 | 9/2003 | Marvin et al. |
| 2003/0182452 A1 | 9/2003 | Upton |
| 2003/0196168 A1 | 10/2003 | Hu |
| 2003/0233631 A1 | 12/2003 | Curry |
| 2004/0015368 A1 | 1/2004 | Potter et al. |
| 2004/0019645 A1 | 1/2004 | Goodman et al. |
| 2004/0040011 A1 | 2/2004 | Bosworth et al. |
| 2004/0068568 A1 | 4/2004 | Griffin |
| 2004/0078373 A1 | 4/2004 | Ghoneimy et al. |
| 2004/0103406 A1 | 5/2004 | Patel |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0033663 A1 | 2/2005 | Narin et al. |
| 2005/0050068 A1 | 3/2005 | Vaschillo et al. |
| 2005/0223392 A1 | 10/2005 | Cox et al. |
| 2005/0278585 A1 | 12/2005 | Spencer |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

FOREIGN PATENT DOCUMENTS

| | | |
|---|---|---|
| EP | 1 006 443 A2 | 6/2000 |
| EP | 1 061 445 A2 | 12/2000 |
| WO | WO9923558 | 5/1999 |
| WO | WO 0029924 | 5/2000 |
| WO | WO 01/90884 A2 | 11/2001 |

OTHER PUBLICATIONS

U.S. Appl. No. 10/293,655, filed Nov. 13, 2002, Potter.
U.S. Appl. No. 10/293,656, filed Nov. 13, 2002, Potter.
U.S. Appl. No. 10/293,674, filed Nov. 13, 2002, Potter.
Embury, S.M., et al., "Assisting the Comprehension of Legacy Transactions," Reverse Engineering, 2001, IEEE Proceedings, Eighth Working Conference on Oct. 2-5, 2001, pp. 345-354 (2001).
Mays, E., et al., "A Persistent Store for Large Shared Knowledge Bases," IEEE Transactions on Knowledge and Data Engineering, vol. 3, No. 1, Mar. 1991, pp. 33-41 (1991).
Tang, C., et al., "Integrating Remote Invocation and Distributed Shared State," IEEE Proceedings of the 18th International Parallel and Distributed Processing Symposium, Apr. 26-30, 2004, 10 pages (2004).

Java Debugging Interface—definition, retrieved from <URL http://java.sun.com/j2se/1.4.2/docs/guide/jpda/jdi/overview-summary.html on Feb. 21, 2007, 3 pages.

International Search Report and Written Opinion dated mailed Mar. 1, 2005, for Application No. PCT/US04/05256.

International Search Report and Written Opinion dated mailed Mar. 7, 2005, for Application No. PCT/US04/05488.

International Search Report and Written Opinion dated mailed Mar. 15, 2005, for Application No. PCT/US04/05622.

International Search Report and Written Opinion dated mailed May 11, 2005, for Application No. PCT/US04/5621.

Sosnoski, Dennis, "XML and Java Technologies: Data Binding, Part 1: Code Generation Approaches—JAXB and More", IBM, pp. 1-11 (Jan. 2003).

Chen, et al., "eCo Architecture for Electronic Commerce Interoperability", Jun. 29, 1999, CommerceNet.*

Blake, "Rule-Driven Coordination Agents: A Self-Configurable Agent Architecture for Distributed Control", IEEE, Mar. 2001, pp. 271-277.

Dahalin et al., "Workflow Interoperability Using Extensible Markup Language (XML)", IEEE, Jul. 2002, pp. 513-516.

Duvos et al., An Infrastructure for the Dynamic Distribution of Web Application and Services, Department of Computer Science Boston Universiry, Dec. 2000, pp. 1-22.

Hewlett-Packard, HP Applicaction Server, Technical Guide Version 8-0, HP, Nov. 15, 2001, pp. I-x, 1-234.

Kunisetty, "Workflow Modeling and Simulation Using an Extensible Object-Oriented Knowledge Base Management System", CiteSeer, 1996, pp. 1-60.

Lauer, "Introducing Microsoft DotNet", Jul. 2, 2002, http://web.archive.org/web/20020702162429/http://www.freebvcode.com/ShowCode.asp?ID=2171.

Mariucci, Enterprise Application Server Development Environments, University of Stuttgart, Oct. 10, 2000, pp. 1-30.

Mohan et al., "Aries: A Transaction Recovery Method Suporting Fine-Graniarity Locking and Partial Rollbacks Using Write-Ahead Logging", ACM Transaction on Database Systems, vol. 17, No. 1, Mar. 1992, pp. 94-162.

Paul, Laura Gibbons, "RosettaNet: Teaching business to work together", Oct. 1, 1999. http://www.developer.com/xml/article.php/616641.

Richter, J., "Advanced Windows Programming", 1996, Microsoft Press™, pp. 697-699.

Roman et al., The Technical Benefits of EJB and J2EE Technolgoies over COM+ and Windows DNA, Enterprise Edition (J2EE) Technologies, Dec. 1999, pp. 1-24.

Sun Microsystems, Iplanet Application Server 6.0 White Paper, iPlanet E-Commerce Solutions, May 25, 2000, pp. 1-104.

Van Der Aaslt et al., "Verification of XRL: An XML-Based Workflow Language", IEEE, Jul. 2001, pp. 427-432.

Kilgore, "Multi-Language, Open-Source Modeling Using the Microsoft.NET Architecture," Proceedings of the 2002 Winter Simulation Conference, Dec. 8-11, 2002, pp. 629-633, IEEE, vol. 1.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al., "A Multimedia Authoring Tool for the Internet", IEEE Transactions on Consumer Electronics, 1997. pp. 304-308.

Smith, et al. "Marching Towards a Software Reuse Future", ACM Ada Letters, Nov./Dec. 1994, pp. 62-72vol. 14, No. 6.

Mohan et al., "Aries: A Transaction Recovery Method Supporting Fine-Granularity Locking and Partial Rollbacks Using Write-Ahead Logging", ACM Transactions on Database Systems (TODS), Mar. 1992, pp. 94-162, vol. 17, Issue 1.

Bea Systems, Inc., "Transforming Data Using Xquery Mapper", BEA AquaLogic Service Bus 2.0 Documentation, 2006, 19 pages.

Stylus Studio, "Xquery Mapper", 2007, 6 pages, Stylus Studios.

Altova, "XML-toXML Mapping", 2007, 3 pages, Altova Map Force.

Jamper, "Jamper-Java XML Mapper", 2007, 4 pages, Sourceforge.

Sharma, "J2EE Connector Architecture Specification, Version 1.0 Final Release", Java 2 Enterprise Edition, Aug. 2001, 90 pages, Sun Microsystems.

Allamaraju, et al., "Professional Java Server Programming J2EE 1.3 Edition", Sep. 2001, pp. 1009-1057, WROX.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Van Der Aalst et al., "XML Based Schema Definition for Support of Inter-Organizational Workflow", University of Colorado and University of Eindhoven report, 2000, retrieved from http://citeseer.ist.psu.edu/vanderaalst00mxl.html, 39 pages.

Plaindoux, "XML Transducers in Java", May 2002, The Eleventh International World Wide Conference, retrieved from: http://www2002.org/CDROM/poster/132/index.html., 6 pages.

Supplementary European Search Report for EP 02784131.1 dated Aug. 8, 2007, 4 pages.

Microsoft, "Microsoft.net Framework", Microsoft Corporation, 2001, 54 pages.

Willink, "Meta-Compilation for C ++", University of Surrey, Jan. 4, 2000, 379 pages.

Peltz, "Web Services Orchestration" Hewlett-Packard, Jan. 2003, 20 pages.

Muller, "Event-Oriented Dynamic Adaptation of Workflows: Model, Architecture and Implementation", 2002, 351 pages, University of Leipzig, Germany.

* cited by examiner

DISTRIBUTED REQUEST AND RESPONSE QUEUES FOR SERVICE PROCESSOR

CLAIM OF PRIORITY

This application is a Continuation of application. Ser. No. 10/293,059, filed Nov. 13, 2002, entitled "SYSTEM AND METHOD FOR PROVIDING HIGHLY AVAILABLE PROCESSING OF ASYNCHRONOUS SERVICE REQUESTS," which is a Non Provisional of application. Ser. No. 60/377,332, filed May 2, 2002 entitled "HIGH AVAILABILITY FOR ASYNCHRONOUS REQUESTS," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,194 entitled "Application View Component for System Integration," by Mitch Upton, filed Oct. 15, 2002.

U.S. patent application Ser. No. 10/293,674 entitled "High Availability Event Topic," by Tim Potter et al., filed Nov. 13, 2002.

U.S. patent application Ser. No. 10/293,655 entitled "High Availability Application View Deployment," by Tim Potter et al., filed Nov. 13, 2002.

U.S. patent application Ser. No. 10/293,656 entitled "High Availability for Event Forwarding," by Tim Potter et al., filed Nov. 13, 2002.

FIELD OF THE INVENTION

The present invention relates to the availability of services such as JMS across a network or in a server cluster.

BACKGROUND

In present application integration (AI) systems, there can be several single points of failure. These single points of failure can include deployment or management facilities, event forwarding, event topics, remote clients, event subscriptions, response listeners, and response queues. Each of these features is tied to a single server within a server cluster. If that single server crashes, the entire AI application can become irreparably damaged and must be rebooted via a server reboot.

Single points of failure such as request and response queue are used for processing asynchronous requests. Current implementations of asynchronous service request processing utilize a single physical request queue and response queue per server instance. In the event of a node failure, all asynchronous requests and responses within a given JMS server, for example, become unavailable until the JMS server is restarted.

BRIEF SUMMARY

Systems and methods in accordance with the present invention can overcome deficiencies in prior art systems by allowing for high-availability processing of asynchronous requests in a single transaction. A distributed request queue can be used to receive and store a service request, such as from a user or client application. A service processor can pull the service request from the request queue and invoke the service for the service request, such as to an enterprise information system. The service processor can receive the service response from the invoked service and forward the service response to a distributed response queue. The distributed response queue can hold the service response until the response is retrieved for the user or client application. An application view client can act on behalf of the user or client application, sending the service request to the distributed request queue and retrieving the service response from the distributed response queue. The application view client can generate failure recovery semantics for the client application in the event of a failure. The application view can also determine whether any service responses are waiting in the distributed response queue for the client application.

These systems and methods can be used in a server cluster. There can be a service processor deployed on every node in the cluster, each of which can listen to a given distributed request queue. This allows a service to be migrated between nodes in the cluster in the event of a node failure.

Other features, aspects, and objects of the invention can be obtained from a review of the specification, the figures, and the claims.

DETAILED DESCRIPTION

Figure 1:
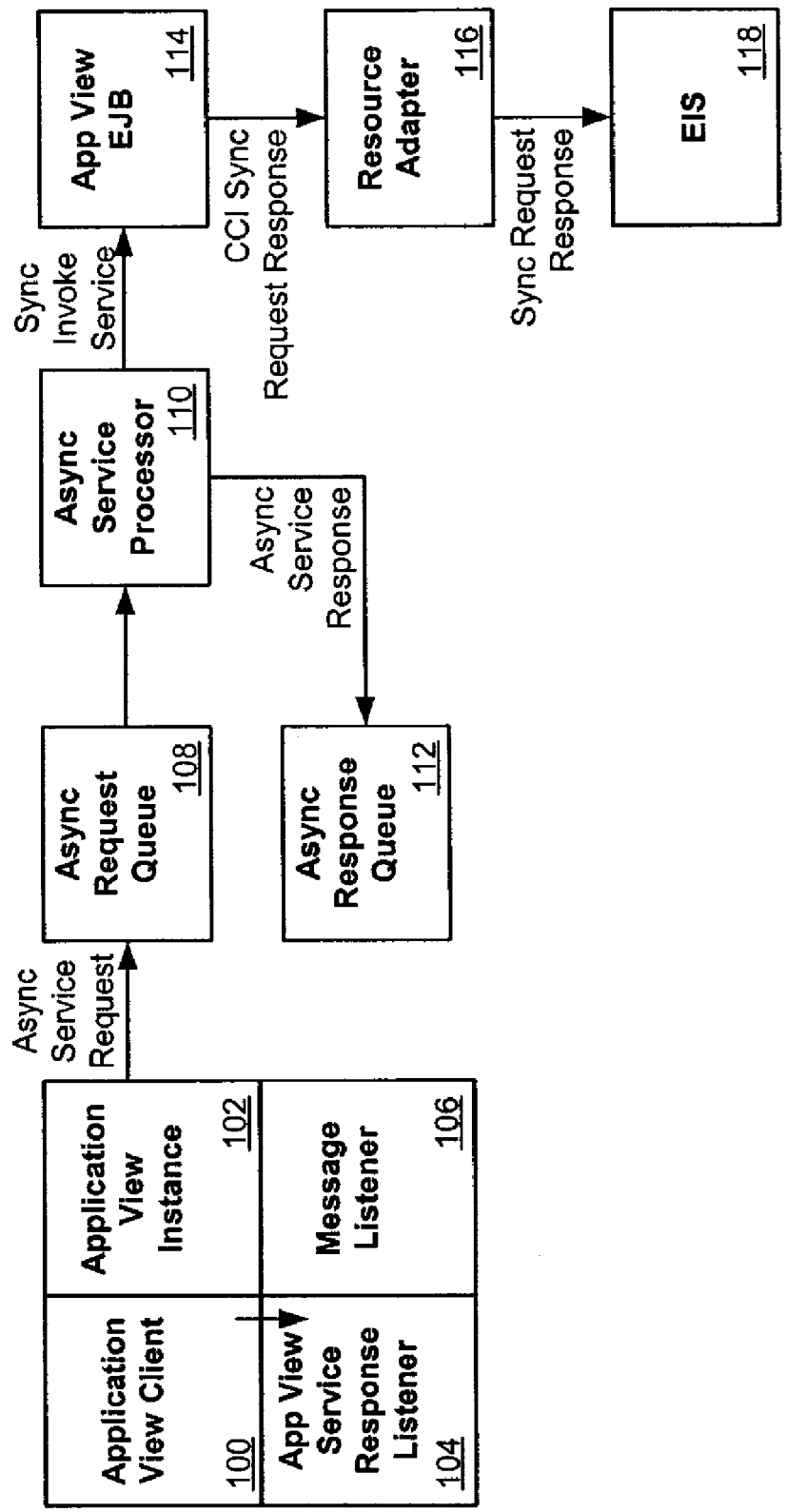
FIG. 1 is a diagram of a system in accordance with one embodiment of the present invention.

A system and method in accordance with one embodiment of the present invention can overcome deficiencies in present asynchronous messaging systems by taking advantage of asynchronous request and response queues, as well as asynchronous request and response processors. A client may wish to invoke a service asynchronously in order to begin and/or continue processing other matters, instead of simply waiting for the response. For example, a long running process such as a batch process run against an SAP system or database can take minutes or even hours. Asynchronous requests can allow a client to send the request and then move on to other business.

The use of server clustering allows an AI component to be used in a scalable and highly available fashion. A highly available component does not have any single points of failure, and can have the ability to migrate services from failed nodes to live nodes in a cluster. Any service offered by the AI component can be targeted to several nodes in a cluster. In the event of a node failure in the cluster, the services located on the failed node can be migrated to another live node in the cluster.

In the event of a crash of a cluster or managed server, the AI application can continue accepting new work. The acceptance of new work can include deploying new and undeploying old application views and connection factories, monitoring of old application views and connection factories, delivering events from adapters, and servicing both synchronous and asynchronous service invocations. An AI application can also support the manual migration of services on the failed node to a live node, such as a singleton message-driven Enterprise JavaBean (MDB) listening on a physical destination managed by a failed JMS server. Application integration can use a singleton MDB if a customer needs ordered event processing, for example. An AI application can notify users in an understandable and/or predictable way that in-flight transactions have been cancelled or rolled-back, and should be retried. Wherever possible, an AI application can retry the transaction after reestablishing connections to make use of resources on another live server.

In the event of an administration (admin) server failure, an AI application can do all the tasks mentioned with respect to a crash of a cluster or managed server. The AI application can also notify users that deployment or undeployment is unavailable while the admin server is unavailable. The AI application can still boot or reboot successfully using the previous domain and/or server configuration.

A system and method in accordance with one embodiment of the present invention allows asynchronous requests and responses to be available within a given JMS server, even in the event of a node failure. Request and response queues, such as ASYNC_REQUEST_QUEUE and ASYNC_RESPONSE_QUEUE, can be deployed as distributed queues in a cluster. A request processor, such as AsyncServiceRequestProcessor, can be packaged as an MDB. Such a system allows the processing of asynchronous requests and responses even if the JMS server that accepted the requests crashes or becomes otherwise unavailable.

In the event that a physical queue fails before an asynchronous service request is received by the appropriate MDB, the request can be unavailable until the physical queue comes back on line. This can hold true for asynchronous service responses. Using a system in accordance with one embodiment of the present invention, an asynchronous service processor MDB can be deployed on a single distributed JMS queue, such as ASYNC_REQUEST_QUEUE. This deployment removes the need to maintain and manage a pool of asynchronous request processor threads. An asynchronous service processor MDB can be last in the deployment order for the AI application, and can be deployed from a JAR file such as "ai-asyncprocessor-ejb.jar."

FIG. 1 shows an example of a high-availability asynchronous service processing system in accordance with one embodiment of the present invention. An application view client 100 has the ability to generate and deal with failure recovery semantics without the user having any knowledge or input. For instance, a client application that sends off a request might crash or otherwise become unavailable at some point before the response is received. When the response is ready to be returned, the response can sit in an asynchronous response queue 112 until the client comes back. When the client 100 is available again, the client will want to receive the response. Since the system is utilizing distributed queues, the client application would need to go out to the server and determine whether there are any responses from previous requests that were sent before the failure. The application view client 100 can take care of this determination behind the scenes, such that the user or client application does not need to do anything to find the response.

The user or client application making the request can register a message listener 106, such that the user or client application can be informed that a message is ready and waiting to be received. An asynchronous service processor 110 can pull a request off the asynchronous request queue 108, invoke the asynchronous service against an Enterprise Information System (EIS) 118, and wait for the response. When the asynchronous service response comes back, the asynchronous service processor 110 can put the response onto the response queue 112. In this embodiment, this processing is accomplished as a single transaction.

The application view client 100 can instantiate an application view instance 102. The client 100 can have the option of supplying a durable client identifier at the time of construction. The durable client identifier can be used as a correlation identifier for asynchronous response messages. The client 100 can invoke an asynchronous service method, such as "invokeServiceAsync", and can pass a request document and response listener 104, such as AsyncServiceResponseListener, to handle the response.

An application view instance 102 can create a service request object, such as AsyncServiceRequest, and can send the object to a request queue 108, such as ASYNC_REQUEST_QUEUE. The service request object can contain the name of the destination to which the response listener is pinned. A service processor MDB 110 can use this information to determine the physical destination to receive the response. If the request object does not contain the name of a response destination, the service processor MBD 110 can use the destination set on the JMS message via a call to a method such as JMSReplyTo( ). If a client only supplies a service response listener 104 to the application view, such as:

invokeServiceAsync(String serviceName, IDocument request, AsyncServiceResponseListener listener);

the application view can establish a JMS queue receiver to the JMS queue bound at a JNDI location provided by an application view Enterprise JavaBean (EJB) method, such as getAsyncResponseQueueJNDIName( ). The application view instance 102 can use QueueReceiver::getQueue( ) to set the ReplyTo destination on the request message.

In a cluster, an asynchronous request queue 108 can be deployed as a distributed JMS queue. Each message can be sent to a single physical queue, and not be forwarded or replicated in any way. As such, the message is only available from the physical queue to which it was sent. If that physical queue becomes unavailable before a given message is received, the message or AsyncServiceRequest can be unavailable until that physical queue comes back on-line. It is not enough to send a message to a distributed queue and expect the message to be received by a receiver of that distributed queue. Since the message is sent to only one physical queue, there must be a queue receiver receiving or listening on that physical queue. Thus, an AI asynchronous service processor MDB can be deployed on all nodes in a cluster.

An asynchronous service processor MDB can receive the message from the queue in a first-in, first-out (FIFO) manner. The service processor can use the asynchronous service request object in a JMS ObjectMessage to determine the qualified name, service name, request document, and response destination of the application view. The asynchronous service processor 110 can use an application view EJB 114 to invoke the service synchronously. The service can be translated into a synchronous CCI-based request and/or response to the resource adapter 116.

When an asynchronous service processor MDB 110 receives the response, the response can be encapsulated into an asynchronous service response object and sent to the response destination provided in the asynchronous service request object. The asynchronous service processor MDB 110 cannot just send the response to the asynchronous response queue 112, the response needs to be sent to a specific physical destination. This specific physical destination, or queue, can have been established by the application view instance 102 running on the client when, for example, an application view EJB method such as getAsyncResponseQueueJNDIName( ) was called.

If the client application fails and a new application view is created with the same durable client identifier, there is a chance that the new application view will be pinned to a different physical JMS queue than the JMS queue that the client was using prior to the failure. Consequently, the application view can use recover logic to query the other members for responses that match the durable client identifier once the client application restarts.

An application view message listener 106 instance, created when the application view instance 102 was instantiated, can receive the asynchronous service response message as a JMS ObjectMessage, and can pass the message to the asynchronous service response listener 104 supplied in the "invokeServiceAsync" call.

Figure 2:
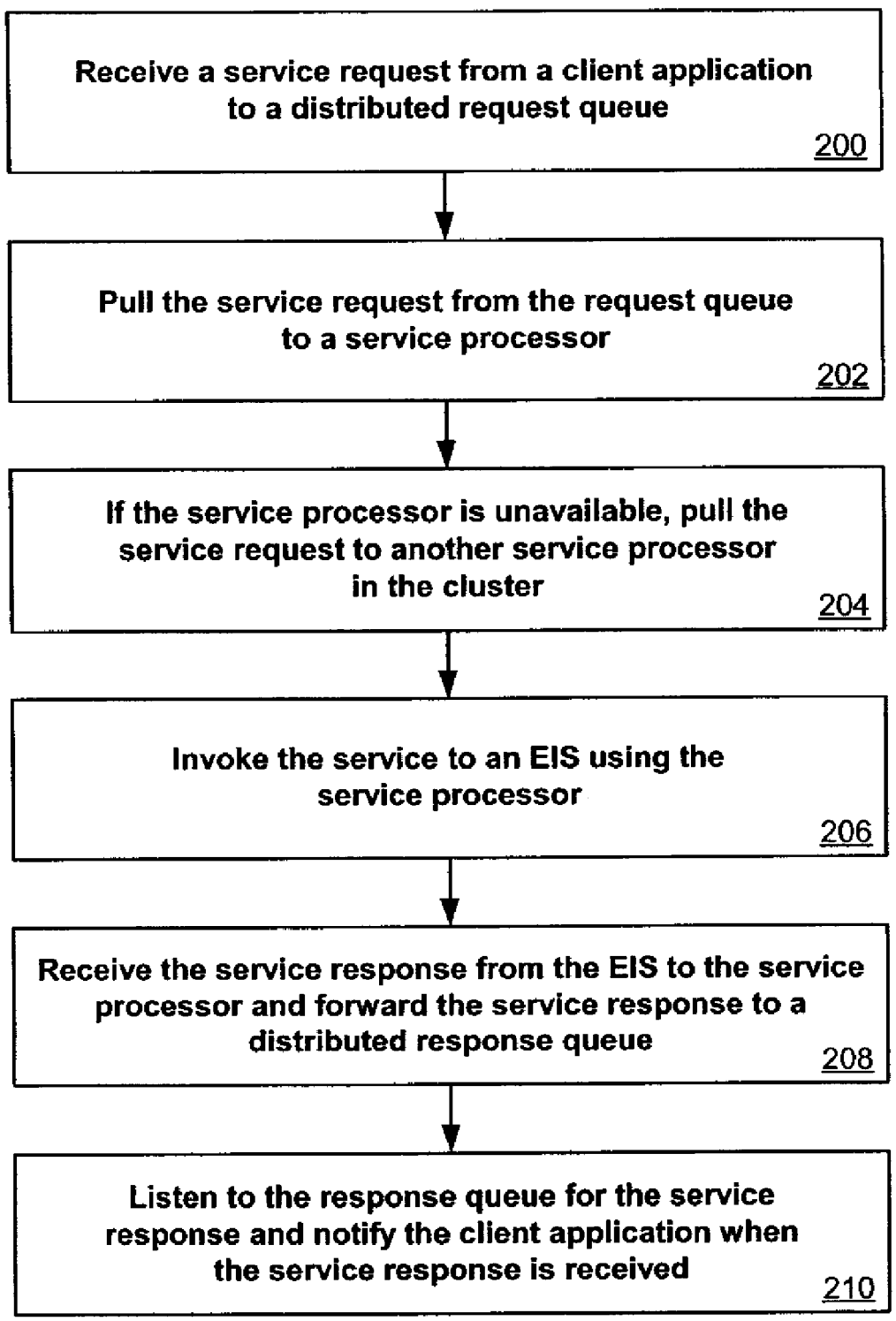
FIG. 2 is flowchart for a method that can be used with the system of FIG. 1.

FIG. 2 shows the steps of a method that can be used with the system of FIG. 1. First, a service request is received to a distributed request queue from a client application 200. The service request is pulled from the request queue to a service processor 202. If the service processor is down, another service processor in the cluster pulls the service request 204. A service is invoked for the service request, such as to an EIS 206. The service response is retrieved by the service processor and forwarded to a distributed response queue for storage until retrieval from a client application 208. A response listener listens to the response queue and notifies the client application when the service response is received 210.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for high-availability processing of asynchronous requests in a single transaction, comprising:
    a request queue for receiving and storing a service request;
    a first service processor, if the first service processor is available, the first service processor pulls the service request from the request queue and invokes the service for the service request, and the first service processor receiving a service response for the service request from the invoked service; and
    wherein if the first service processor is unavailable, a second service processor pulls the service request from the request queue and invokes the service for the service request, the second service processor receiving a service response for the service request from the invoked service;
    a response queue for receiving the service response from the first or second service processor and storing the service response.

2. A system according to claim 1, further comprising: an enterprise information system containing the service invoked by the service processor.

3. A system according to claim 1, wherein: said service processor is packaged as a message-driven Enterprise JavaBean.

4. A system according to claim 1, further comprising: an application view client for sending the service request to the request queue and retrieving the service response from the distributed response queue on behalf of a client application.

5. A system according to claim 4, wherein: said application view client can generate failure recovery semantics for the client application.

6. A system according to claim 4, wherein: the response queue is adapted to store the service response until the response is retrieved by the application view client.

7. A system according to claim 4, wherein: said application view is adapted to determine whether any service responses are waiting in the response queue for the client application.

8. A system according to claim 4, further comprising: a client identifier for identifying the client application, the client identifier used to process the service request and service response for the client application.

9. A system for according to claim 4, wherein: said application view client passes the service request to the request queue in a request document.

10. A system according to claim 9, wherein: said application view further passes a service response listener with the request document, the service response listener adapted to listen for the service response corresponding to the service request document.

11. A system according to claim 1, wherein: said service processor is deployed on a node in a cluster.

12. A system according to claim 11, further comprising: additional service processors, each additional service processor deployed on different node in the cluster.

13. A system according to claim 12, wherein: the additional service processors are adapted to listen to the request queue for a service request, each of the additional service processors capable of pulling the service request from the request queue and invoking the service for the service request if the service processor is unavailable.

14. A system according to claim 1, wherein: said first or second service processor further encapsulates the service response into a service response object that is sent to the response queue.

15. A method for high-availability processing of asynchronous requests in a single transaction, comprising:
    receiving a service request to a request queue from a client application;
    if a first service processor is available pulling the service request from the request queue to the first service processor and invoking a service for the service request; and
    receiving the service response from the invoked service to a response queue and storing the service response until retrieval from a client application;
    wherein if the first service processor is unavailable, a second service processor pulls the service request from the request queue and invokes the service for the service request, the second service processor receiving a service response for the service request from the invoked service.

16. A method according to claim 15, further comprising: executing the invoked service using an enterprise information system.

17. A method according to claim 15, further comprising: deploying an additional service processor on each node of the cluster containing the service processor.

18. A method according to claim 17, further comprising: listening to the request queue using with the service processor and any additional service processors.

19. A method according to claim 15, further comprising: packaging the service processor as a message-driven Enterprise JavaBean.

20. A method according to claim 15, further comprising: using an application view client to send service requests and receive service responses on behalf of the client application.

21. A method according to claim 20, further comprising: generating failure recovery semantics using the application view client.

22. A method according to claim 15, further comprising: assigning a client identifier to the service request to be used in processing the service request and service response.

23. A method according to claim 15, wherein: the step of sending a service request includes passing a request document and response listener to the service processor.

24. A computer readable storage medium including code for execution by a server computer for high-availability processing of asynchronous requests in a single transaction, comprising:
- computer code for receiving a service request to a distributed request queue from a client application;
- computer code if a first service processor is available for pulling the service request from the request queue to a first service processor and invoking a service for the service requests; and for receiving the service response from the invoked service to a response queue and storing the service response until retrieval from a client application;
- wherein if the first service processor is unavailable, a second service processor pulls the service request from the request queue and invokes the service for the service request, the second service processor receiving a service response for the service request from the invoked service.

* * * * *

UNITED STATES PATENT AND TRADEMARK OFFICE
CERTIFICATE OF CORRECTION

PATENT NO. : 7,516,176 B2
APPLICATION NO. : 11/684435
DATED : April 7, 2009
INVENTOR(S) : Potter et al.

It is certified that error appears in the above-identified patent and that said Letters Patent is hereby corrected as shown below:

On page 4, in column 1, under "Other Publications", line 24, delete "Universiry," and insert -- University, --, therefor.

On page 4, in column 1, under "Other Publications", line 25, delete "Applicaction" and insert -- Application --, therefor.

On page 4, in column 1, under "Other Publications", line 35, delete "Suporting" and insert -- Supporting --, therefor.

On page 4, in column 1, under "Other Publications", line 36, delete "Graniarity" and insert -- Granularity --, therefor.

On page 4, in column 1, under "Other Publications", line 44, delete "Technolgoies" and insert -- Technologies --, therefor.

Signed and Sealed this

Twenty-fifth Day of May, 2010

David J. Kappos
*Director of the United States Patent and Trademark Office*